United States Patent
Lee et al.

(10) Patent No.: US 7,412,173 B2
(45) Date of Patent: Aug. 12, 2008

(54) APPARATUS FOR GENERATING OPTICAL CARRIER SUPPRESSED RETURN-TO-ZERO

(75) Inventors: Dong Soo Lee, Daejeon (KR); Man Seop Lee, Daejeon (KR); Sang Soo Lee, Daejeon (KR); Je Soo Ko, Daejeon (KR)

(73) Assignees: Electronics and Telecommunications Research Institute, Daejeon (KR); Information and Communications University Educational Foundation, Seoul (KR)

( * ) Notice: Subject to any disclaimer, the term of this patent is extended or adjusted under 35 U.S.C. 154(b) by 556 days.

(21) Appl. No.: 10/802,762

(22) Filed: Mar. 18, 2004

(65) Prior Publication Data

US 2004/0184818 A1   Sep. 23, 2004

(30) Foreign Application Priority Data

Mar. 19, 2003   (KR) .................... 10-2003-0017023

(51) Int. Cl.
*H04B 10/04* (2006.01)
(52) U.S. Cl. .................. 398/183; 398/182; 398/186; 398/187; 398/188; 398/189; 359/237; 359/238; 359/279
(58) Field of Classification Search ......... 398/182–201; 385/3; 359/237–238, 276–279
See application file for complete search history.

(56) References Cited

U.S. PATENT DOCUMENTS

| | | | | |
|---|---|---|---|---|
| 5,543,952 A * | 8/1996 | Yonenaga et al. | ........... | 398/185 |
| 5,805,321 A * | 9/1998 | Ooi et al. | ........... | 398/98 |
| 6,278,539 B1 | 8/2001 | Ooi et al. | ........... | 359/237 |
| 6,606,424 B2 * | 8/2003 | Ooi et al. | ........... | 385/3 |
| 6,980,746 B2 * | 12/2005 | Hayee | ........... | 398/183 |
| 7,116,917 B2 * | 10/2006 | Miyamoto et al. | ........... | 398/185 |
| 7,333,736 B2 * | 2/2008 | Sardesai et al. | ........... | 398/201 |
| 2001/0017724 A1 * | 8/2001 | Miyamoto et al. | ........... | 359/158 |
| 2003/0053179 A1 | 3/2003 | Hayee | | |
| 2003/0161581 A1 | 8/2003 | Nishiki et al. | | |

OTHER PUBLICATIONS

Yutaka et al: "Novel Modulation and Detection for Bandwidth-Reduced RZ Formats Using Duobinary-Mode Splitting in Wideband PSK/ASK Conversion" @2002 IEEE.*

(Continued)

*Primary Examiner*—Kenneth Vanderpuye
*Assistant Examiner*—Phyowai Lin
(74) *Attorney, Agent, or Firm*—Lowe Hauptman Ham & Berner LLP

(57) ABSTRACT

An apparatus for generating a Carrier-Suppressed Return-to-Zero (CS-RZ) signal is disclosed. The apparatus includes a mixer, a Low Pass Filter (LPF), a driver amplifier and a single external modulator. The mixer generates a modulator input by mixing data with a half clock signal. The LPF band-limits the modulator input data into low frequency band data. The driver amplifier amplifies the modulator input data generated by the mixing of the mixer and the band-limiting of the LPF. The external modulator generates CS-RZ signal, in which the phases of adjacent pulses have been inverted, by applying bias voltage to the modulator input data to be placed at the null point of the transfer function of the external modulator.

4 Claims, 8 Drawing Sheets

OTHER PUBLICATIONS

F. Liu et al., "A novel chirped return-to-zero transmitter and transmission experiments," European Conference on Optical Communication 2000, Munich, Germany, vol. 3, pp. 113-114, Sep. 3-7, 2000.*

Anes Hodzic et al. "Alternative Modulation Formats in Nx40Gb/s WDM Standard Fiber RZ-Transmission Systems" by Journal of Lightwave Technology, vol. 20, No. 4, Apr. 2002.*

Yutaka Miyamoto, Kazushige Yonenaga, Akira Hirano and Masahito Tomizawa, "N×40-Gbit/s DWDM Transport System Using Novel Return-to -Zero Formats with Modulation Bandwidth Reduction", Journal of the IEICE Trans. Commun., vol. E85-B, No. 2, Feb. 2002, pp. 374-385.

* cited by examiner

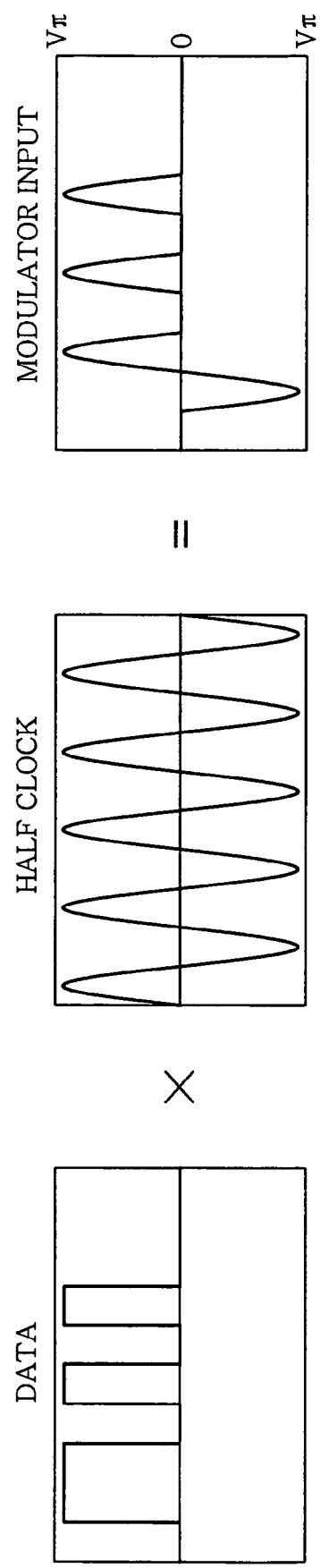

APPARATUS FOR GENERATING OPTICAL CARRIER SUPPRESSED RETURN-TO-ZERO

FIELD OF THE INVENTION

The present invention relates generally to an apparatus for generating a carrier-suppressed return-to-zero (CS-RZ) optical signal; and, more particularly, to an apparatus for generating a CS-RZ optical signal, which improves the weak dispersion characteristics of a conventional CS-RZ signal and reduces the increase of costs attributable to the use of two external modulators, in the construction of a new optical transmitter using a single external modulator, an electrical mixer and a low pass filter.

BACKGROUND OF THE INVENTION

In general, with the development of a very high speed, large capacity, long haul optical transmission system required in the optical Internet and large capacity optical transmission systems, a transmission rate of 7.5 Thz can be obtained using optical amplification technology with a wavelength bandwidth of 60 nm based on a 10 Gbit/s optical transmission system being currently commercialized.

However, 40-Gbit/s or beyond per channel transmission technology is required for the scheme of enabling very high speed transmission while reducing the number of channels because an effective transmission wavelength becomes narrower than the above-described wavelength bandwidth of 60 nm when guard wavelength intervals are taken into consideration in terms of cross talk between WDM channels.

Meanwhile, when the transmission rate per channel of an optical signal increases from 10 Gbit/s to 40 Gbit/s or beyond, signal distortion in an optical link is increased four or more times as much as at 10 Gbit/s due to the increase of required OSNR, chromatic dispersion, polarization mode dispersion and a non-linearity effect.

Of the above-described causes of signal distortion, the chromatic dispersion is increased 16 or more times as much as at 10 Gbit/s, so that a more accurate method is required to compensate for the chromatic dispersion for all the channels in broadband WDM transmission. Furthermore, signal distortion attributable to the polarization mode dispersion is increased four or more times as much as at 10 Gbit/s, so that an active polarization mode dispersion device is required to compensate for such signal distortion.

The increase of signal distortion restricts the transmission distance of an existing optical transmission system, and acts as a cause to change the configuration of an existing optical network.

In the meantime, a Non-Return-to-Zero (NRZ) signal scheme is advantageous in that the manufacturing costs thereof can be reduced because it allows the construction of a transmitter to be simplified, but is weak to signal distortion attributable to chromatic dispersion, polarization mode dispersion and a non-linearity phenomenon of the optical link. Accordingly, a Return-to-Zero (RZ) signal scheme is preferred.

Such a RZ signal scheme is advantageous in that receiver sensitivity at the receiver is superior, it is convenient to extract a clock signal, and signal distortion attributable to the non-linearity phenomenon is small, but is disadvantageous in that it is weak to chromatic dispersion because its optical spectrum bandwidth is wide.

Accordingly, the results of researches for improving transmission characteristics while reducing the spectrum bandwidth of an optical signal using a CS-RZ scheme have been reported. A CS-RZ signal is characterized in that it is robust to the non-linearity phenomenon of an optical fiber, can be transmitted over a long haul, and allows more channels in an available wavelength region to be utilized because the optical spectrum bandwidth thereof is narrower than that of the conventional RZ signal.

In the meanwhile, a conventional optical transmitter for generating a CS-RZ signal utilizes two external modulators, the first one of which is utilized to optically modulate NRZ data, and the second one of which is utilized to generate carrier-suppressed pulses. In this case, a RF signal input to the second external modulator is a clock signal having half of a data transmission rate and voltage two times of the first external modulator, with a bias voltage to be placed at the null point of the transfer function of the second external modulator. Thereby generated optical clock signal is mixed with a NRZ optical signal at an optical domain, thus producing a CS-RZ signal.

The reference papers related to conventional optical transmitters for generating CS-RZ signals are as follows:

1. Yutaka MIYAMOTO, Kazushige YONENAGA, Akira HIRANO, Masahito TOMIZAWA, N×40-Gbit/s DWDM Transport System Using Novel Return-to-Zero Formats with Modulation Bandwidth Reduction, IEICE Transactions on Communications, February 2002, Vol. E85-B, No. 2, pp. 374-385

2. Kiyoshi FUKUCHI, Kayato SEKIYA, Risato OHHIRA, Yutaka YANO, Takashi ONO, 1.6-Tb/s (40×40 Gb/s) Dense WDM Transmission Experiment Over 480 km (6×80 km) Using Carrier-Suppressed Return-to-Zero Format, IEICE Transactions on Communications, February 2002, Vol. E85-B, No. 2, pp. 403-409

3. Vassilieva, O.; Hoshida, T.; Choudhary, S.; Castanon, G.; Kuwahara, H., Numerical comparison of NRZ, CS-RZ and IM-DPSK formats in 43 Gbit/s WDM transmission, Lasers and Electro-Optics Society, 2001. LEOS 2001. The 14th Annual Meeting of the IEEE, Volume 2, 2001, pp. 673~674

In the meantime, the CS-RZ signal is characterized in that it is robust to the non-linearity phenomenon of an optical fiber, such as Stimulated Brillouin Scattering (SBS), Self Phase Modulation (SPM) and Cross Phase Modulation (XPM).

However, the CS-RZ signal is characterized in that it is relatively weak to optical fiber dispersion, so that it is problematic in that the weakness makes the design and management of an optical link difficult. Furthermore, as shown in FIG. 1, a conventional method employs two external modulators for generating a RZ signal and modulating data to generate a CS-RZ signal. Accordingly, a problem arises in that the use of the two modulators increase the costs of an optical transmitter because the external modulators are most expensive in the construction of the optical transmitter.

SUMMARY OF THE INVENTION

It is, therefore, an object of the present invention to provide an apparatus for generating a CS-RZ optical signal, which is capable of generating an optical signal having weak dispersion characteristics, which the CS-RZ optical signal has, in the construction of a new optical transmitter that generates a CS-RZ signal using a single external modulator, an electrical mixer and a low pass filter (LPF).

In accordance with the present invention, there is provided an apparatus for generating a CS-RZ signal, including a mixer generating a modulator input by mixing data with a half clock signal; a LPF band-limiting the modulator input data, which has been provided from the mixer, into low frequency band data; a driver amplifier amplifying the modulator input data generated by the mixing of the mixer and the band-limiting of the LPF; and an external modulator generating a CS-RZ signal, in which phases of adjacent pulses have been inverted, by applying bias voltage to the modulator input data, which has been amplified by the driver amplifier, to be placed at the null point of the transfer function of the external modulator.

BRIEF DESCRIPTION OF THE DRAWINGS

The above and other objects and features of the present invention will become apparent from the following description of preferred embodiments given in conjunction with the accompanying drawings, in which:

FIG. 3 is a view illustrating the principle of the generation of an optical modulator drive signal used to generate the CS-RZ optical signal in accordance with a preferred embodiment of the present invention;

DETAILED DESCRIPTION OF THE PREFERRED EMBODIMENTS

Figure 1:
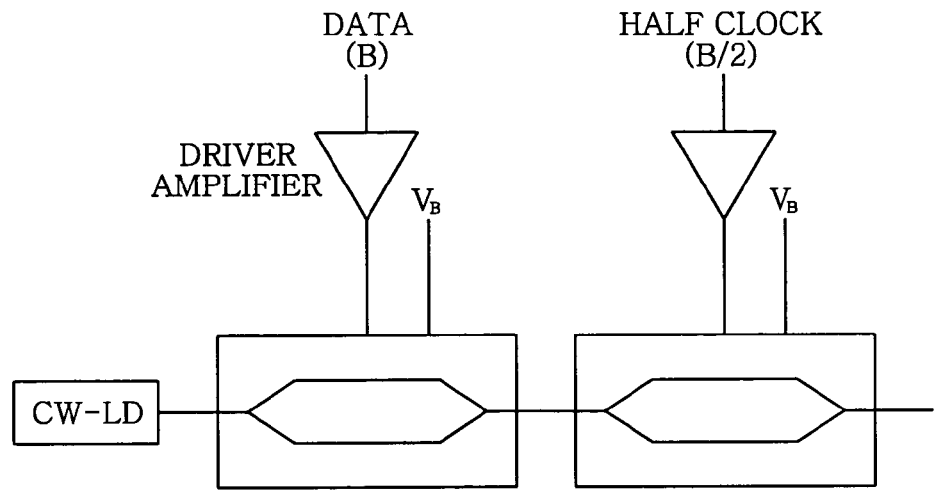
FIG. 1 is a configuration diagram showing a conventional optical transmitter for generating a CS-RZ optical signal.

Reference now should be made to the drawings, in which the same reference numerals are used throughout the different drawings to designate the same or similar components.

Figure 2:
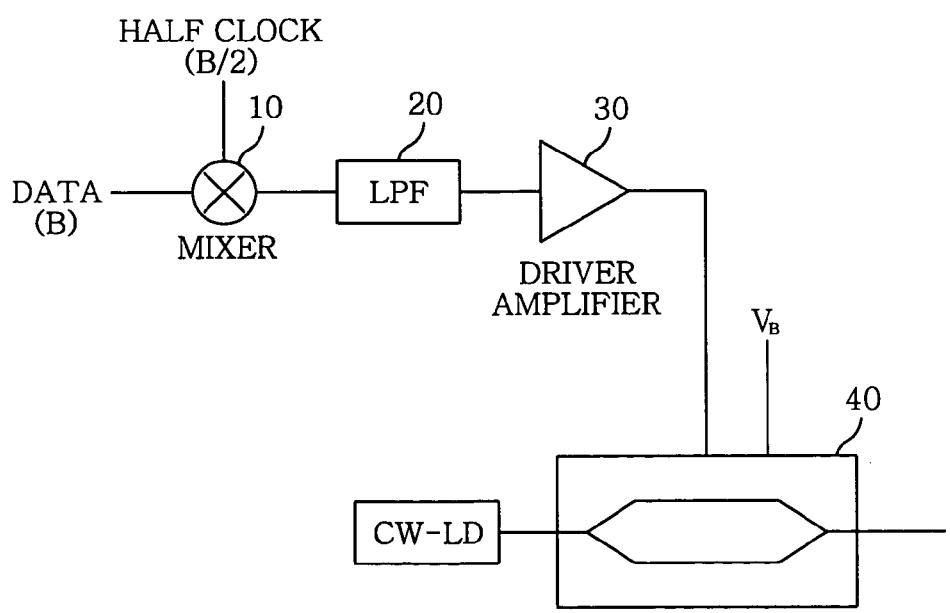
FIG. 2 is a configuration diagram showing an optical transmitter for generating a CS-RZ optical signal in accordance with a preferred embodiment of the present invention.

FIG. 2 is a configuration diagram of an optical transmitter for generating a CS-RZ optical signal in accordance with the present invention. The optical transmitter of the present invention includes a mixer 10 that mixes two RF signals in an electrical signal region, a Low Pass Filter (LPF) 20 that passes only a low frequency band therethrough, a driver amplifier 30 that amplifies an optical signal filtered to a low frequency band signal, and an external modulator 40 that generates a CS-RZ signal.

The mixer 10, as shown in FIG. 3, mixes data having a transmission rate B with a half clock having half of a transmission rate B/2 into a modulator input and provides the modulator input to the LPF 20.

That is, the mixer 10 provides modulator input data to the LPF 20, with logical data "0" being adjusted to data 0V and a clock signal being adjusted to symmetrically swing around 0 V.

The LPF 20 band-limits modulator input data, which has been provided from the mixer 10, into a low frequency band signal, and provides the low frequency band signal to the driver amplifier 30. In this case, the band-limiting decreases the optical spectrum bandwidth of a CS-RZ signal while reducing the noise of a signal, and the decrease of the optical spectrum bandwidth results in the improvement in the dispersion characteristics of the optical signal. In this case, the bandwidth of the LPF is adjusted to increase the dispersion tolerance of an optical signal while minimizing the distortion of the signal.

The driver amplifier 30 amplifies the modulator input data provided from the mixer 10 and band-limited through the LPF 20 so that logical data "0" becomes 0 V and logical data "1" becomes $\pm V\pi$, the voltage required for $\pi$ phase difference in the external modulator, and provides the amplified modulator input data to the external modulator 40.

The external modulator 40 applies a bias voltage to the amplified modulator input data, which has been amplified by the driver amplifier 30, so that the amplified modulator input data is placed at the null point of the transfer function of the external modulator, thus generating a CS-RZ signal in which the phases of adjacent pulses have been inverted.

Figure 4A:
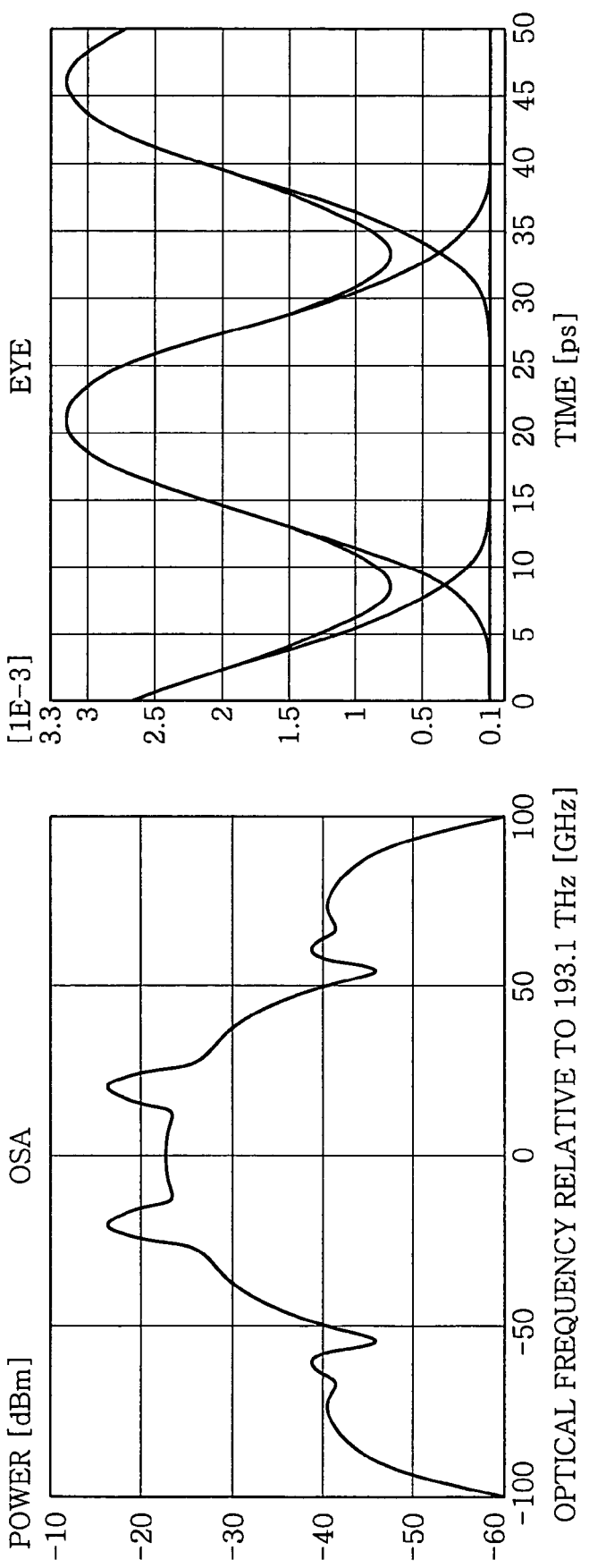
FIGS. 4A to 4D are graphs illustrating the optical spectra and eye diagrams of a CS-RZ signal generated by the optical transmitter of FIG. 2.
Figure 4B:
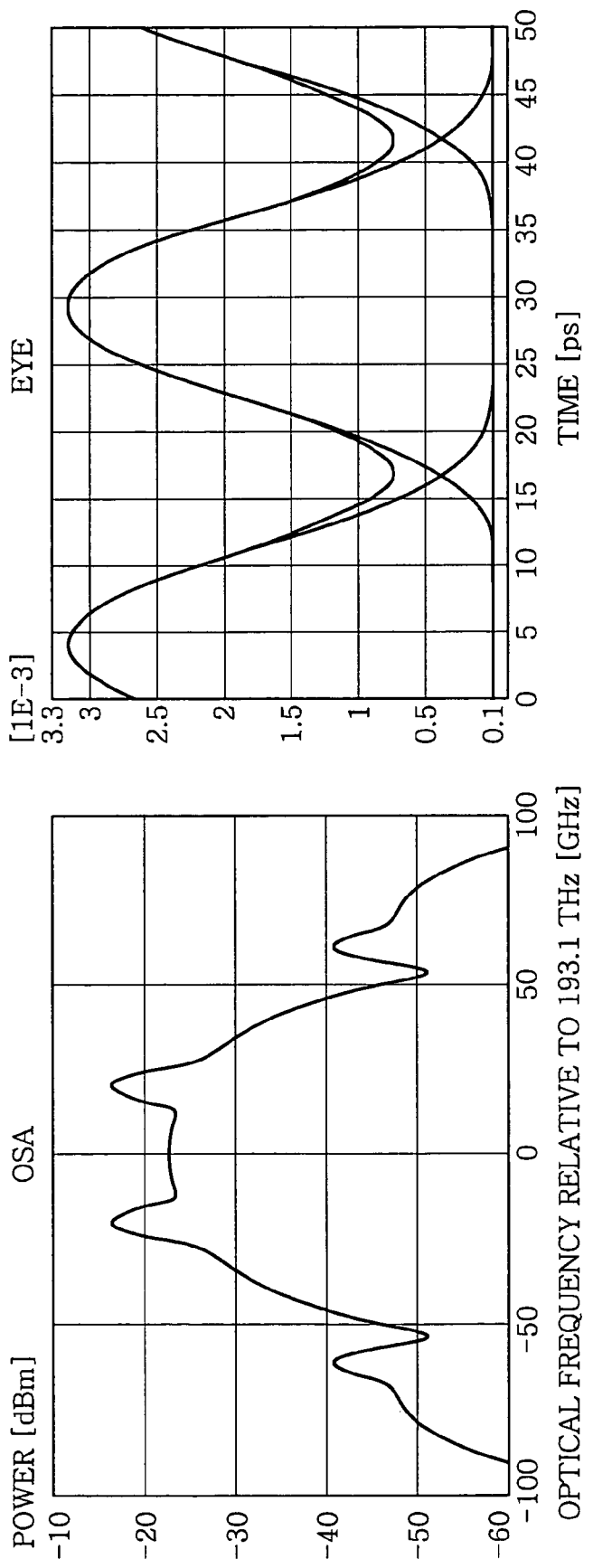
Figure 4C:
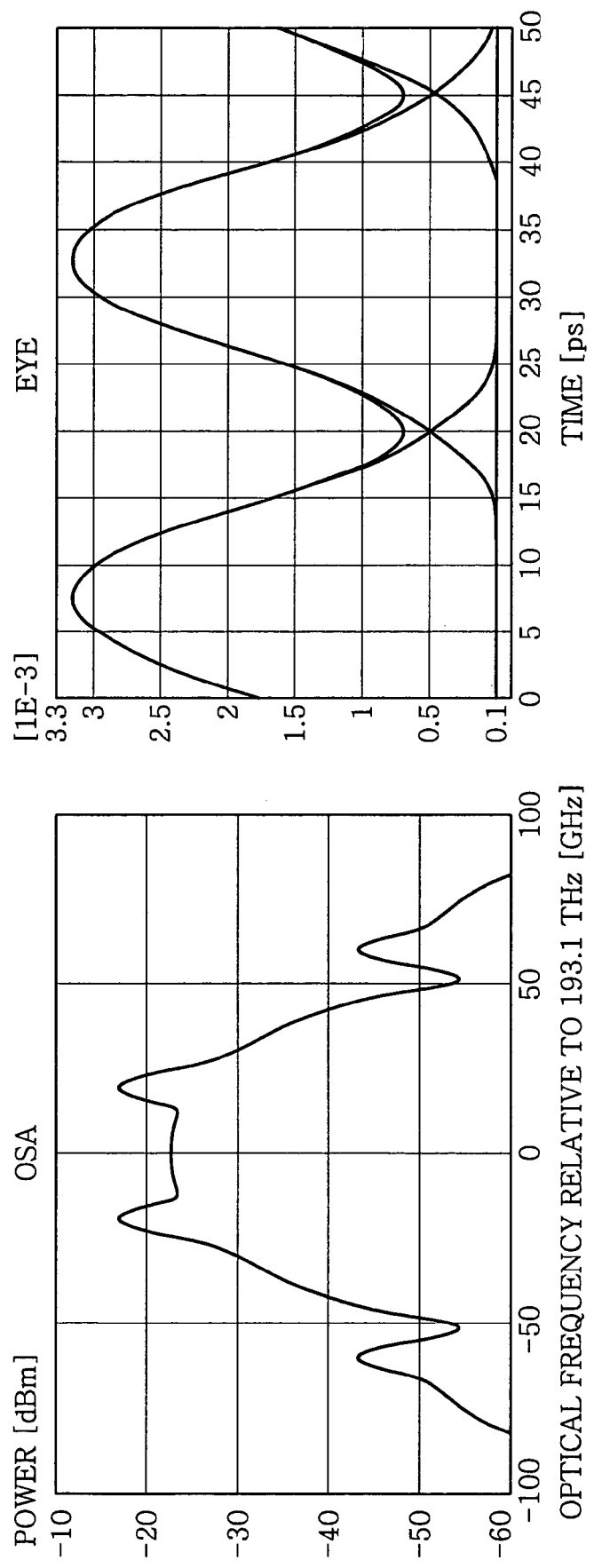
Figure 4D:
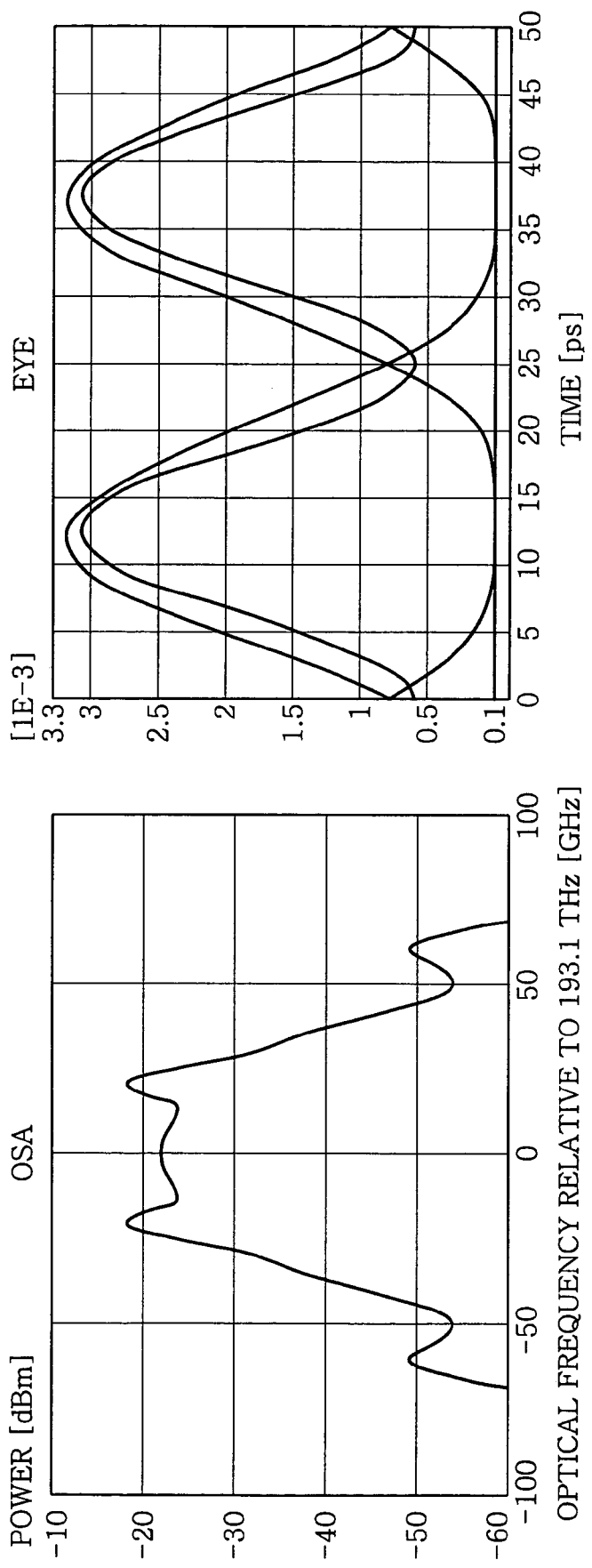

In the meantime, FIGS. 4A and 4D are graphs illustrating the optical spectra and eye-diagrams of the CS-RZ signal generated by the optical transmitter of FIG. 2. FIG. 4A illustrates the case where there is no electrical band limiting. FIG. 4B illustrates the case where the bandwidth of the LPF is 1B (B=40 Gbit/s). FIG. 4C illustrates the case where the bandwidth of the LPF is 0.75 B. FIG. 4D illustrates the case where the bandwidth of the LPF is 0.5 B. From the drawings, with the decrease of the bandwidth of the LPF, the bandwidth of the spectrum of an optical signal is decreased, while the signal distortion of the eye diagram is increased. In other words, the decrease in the spectrum bandwidth of the optical signal causes dispersion tolerance to increase in the optical link.

Figure 5:
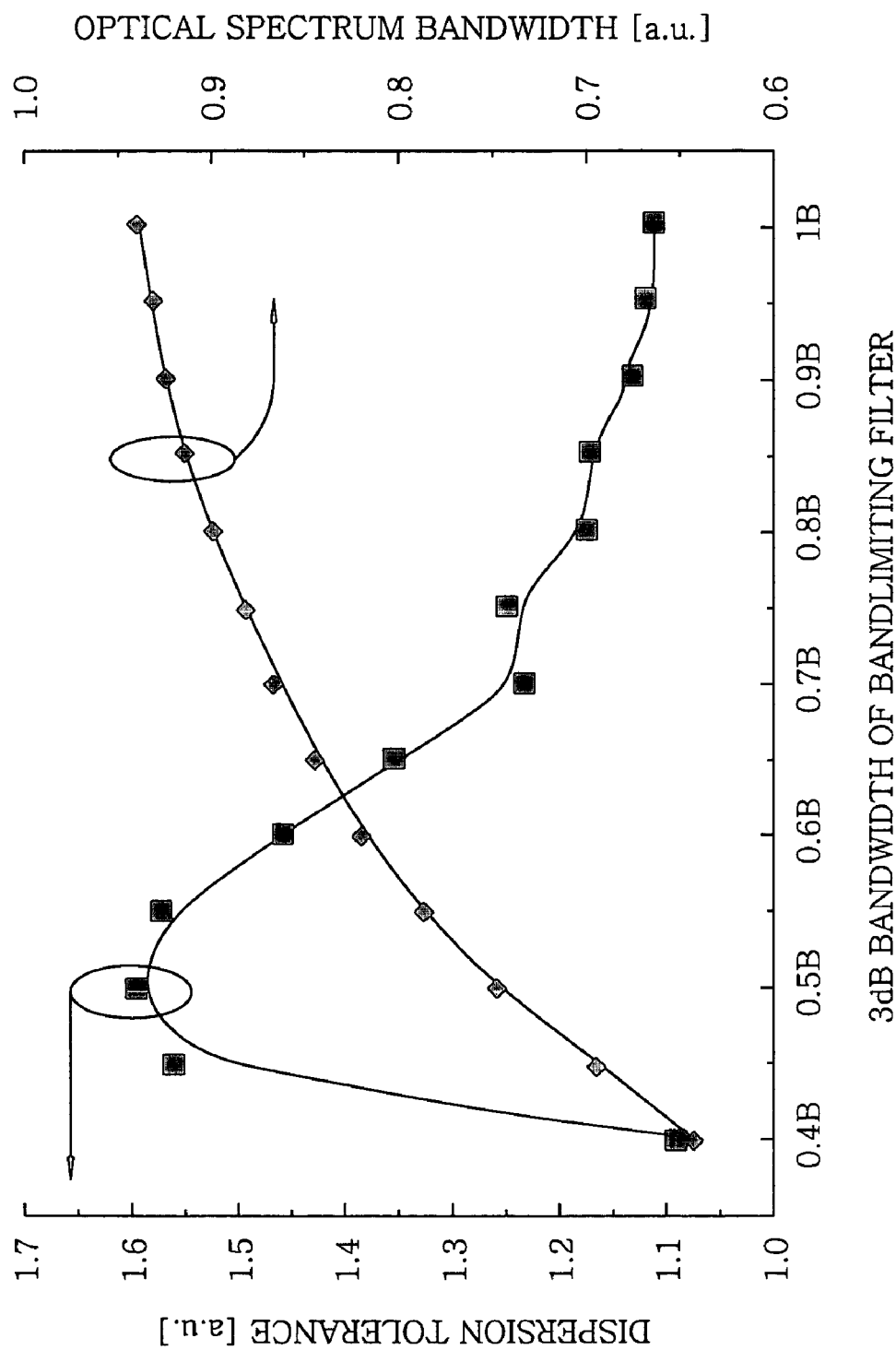
FIG. 5 is a graph illustrating the results of simulation tests on the dispersion characteristics and optical signal bandwidth of the CS-RZ signal based on the LPF in accordance with a preferred embodiment of the present invention.
Figure 6:
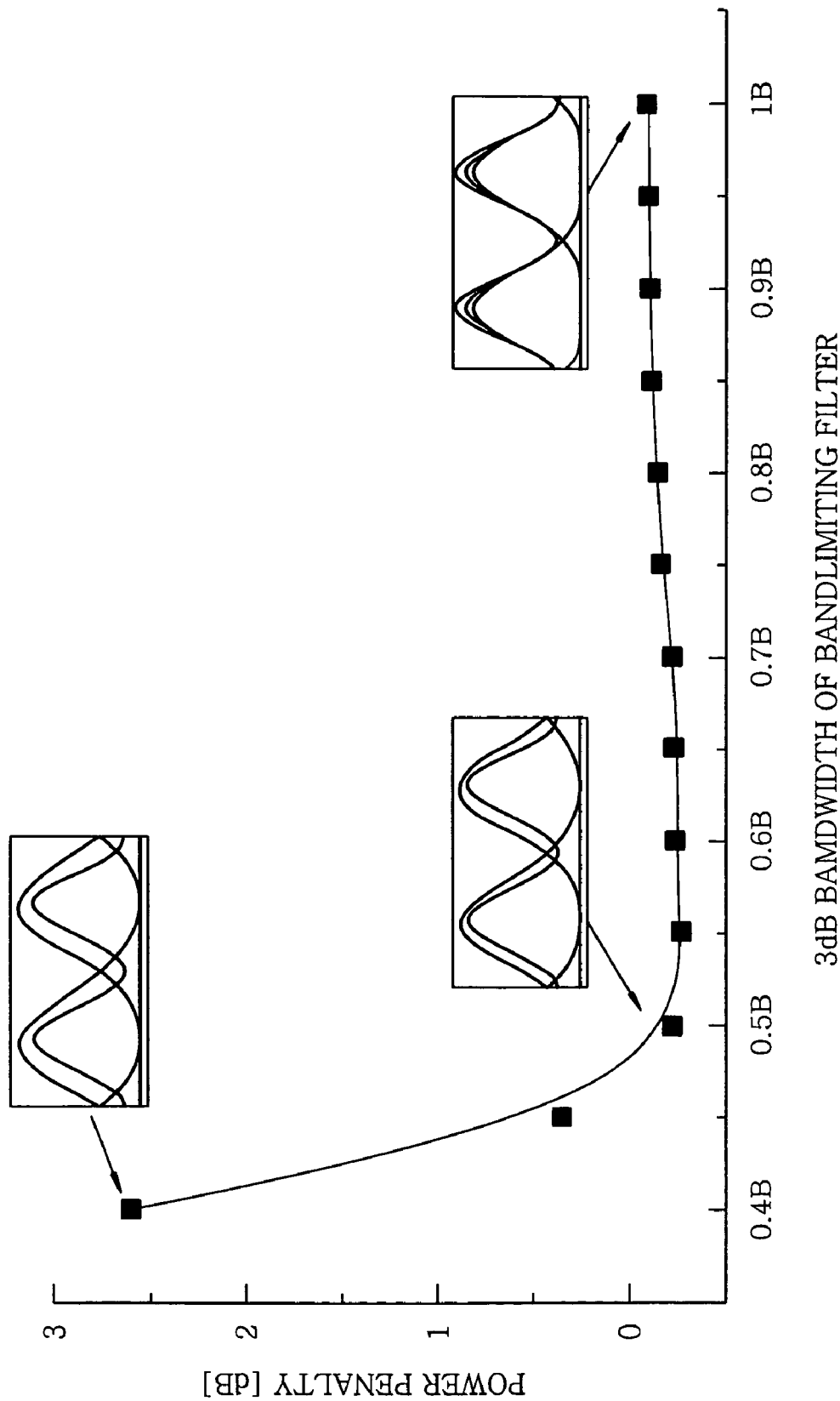
FIG. 6 is a graph illustrating the results of simulation tests on the power penalty and eye diagram of the CS-RZ signal depending on the bandwidth of the LPF in accordance with a preferred embodiment of the present invention.

FIG. 5 is a graph illustrating the results of simulation tests on the dispersion characteristics and optical signal bandwidth of the CS-RZ signal based on the LPF in accordance with the present invention. An ideal mixer is used to examine the characteristics of the CS-RZ signal, a four-order Bessel filter is used as a LPF, and a three-order Gaussian bandpass filter is used as a WDM filter at an optical link.

As a result, in the case where the LPF 20 is used, as in the present invention, as the bandwidth of a filter becomes narrower, the magnitude of dispersion tolerance becomes larger and the spectrum bandwidth of an optical signal becomes narrower, in comparison with that in the case where a LPF is not used.

As described above, the present invention provides an apparatus for generating a CS-RZ optical signal, which generates an optical signal having weak dispersion characteristics, which the CS-RZ optical signal has, in the construction of a new optical transmitter that generates a CS-RZ signal using a single external modulator, an electrical mixer and a LPF, thereby facilitating the design and management of an optical link. Furthermore, the costs of an optical transmitter can be reduced by the generation of a RZ signal for the purpose of generating the CS-RZ signal and the use of the single external modulator for the purpose of modulating data.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for generating a Caffier-Suppressed Return-to-Zero (CS-RZ) signal, comprising:
   a mixer generating a modulator input by mixing data with a half clock signal;
   a Low Pass Filter (LPF) band-limiting the modulator input data, which has been provided from the mixer, into low frequency band data;

a driver amplifier amplifying the modulator input data generated by the mixing of the mixer and the band-limiting of the LPF; and an external modulator generating a CS-RZ signal, in which phases of adjacent pulses are inverted, by applying bias voltage to the modulator input data, which has been amplified by the driver amplifier, to be placed at a null point of a transfer function of the external modulator;

wherein the mixer adjusts logical data "0" to data 0 V and adjusts a clock signal to symmetrically swing around 0 V; and wherein the bandwidth of the LPF is adjusted to increase dispersion tolerance of the optical signal while minimizing distortion of the optical signal.

2. The apparatus of claim 1, wherein:

the band limiting reduces an optical spectrum bandwidth of the CS-RZ signal while reducing noise of the signal; and the decrease of the optical spectrum bandwidth improves dispersion characteristics of the optical signal.

3. The apparatus of claim 1, wherein the driver amplifier performs amplification so that logical data "0" becomes 0 V and logical data "1" becomes $\pm V\pi$.

4. The apparatus of claim 1, wherein the LPF is an electrical filter designed to reduce the spectrum of an inputted optical signal and improve the dispersion characteristics of the optical signal.

* * * * *